(12) United States Patent  
Cheung et al.

(10) Patent No.: US 9,191,272 B2
(45) Date of Patent: Nov. 17, 2015

(54) PROTECTION SWITCHING METHOD AND APPARATUS

(71) Applicant: Electronics and Telecommunications Research Institute, Daejeon (KR)

(72) Inventors: Taesik Cheung, Daejeon (KR); Jeong-Dong Ryoo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 117 days.

(21) Appl. No.: 14/020,219

(22) Filed: Sep. 6, 2013

(65) Prior Publication Data

US 2014/0071813 A1    Mar. 13, 2014

(30) Foreign Application Priority Data

Sep. 7, 2012 (KR) .......... 10-2012-0099524
Sep. 6, 2013 (KR) .......... 10-2013-0107097

(51) Int. Cl.
*H04L 12/24* (2006.01)
*H04L 12/931* (2013.01)
*H04L 12/707* (2013.01)

(52) U.S. Cl.
CPC ........ *H04L 41/0668* (2013.01); *H04L 41/0663* (2013.01); *H04L 49/65* (2013.01); *H04L 45/22* (2013.01)

(58) Field of Classification Search
None
See application file for complete search history.

(56) References Cited

U.S. PATENT DOCUMENTS

| | | | |
|---|---|---|---|
| 6,947,377 B1 * | 9/2005 | Shimano et al. | 370/228 |
| 6,992,978 B1 * | 1/2006 | Humblet et al. | 370/228 |
| 2005/0099941 A1 * | 5/2005 | Sestito et al. | 370/228 |
| 2005/0201276 A1 * | 9/2005 | Sinha | 370/225 |
| 2009/0034975 A1 * | 2/2009 | Sadananda | 398/79 |
| 2010/0254701 A1 * | 10/2010 | Wen | 398/2 |
| 2011/0075549 A1 * | 3/2011 | Lu et al. | 370/216 |
| 2012/0163224 A1 * | 6/2012 | Long | 370/252 |
| 2012/0281525 A1 * | 11/2012 | Addanki et al. | 370/225 |
| 2013/0294229 A1 * | 11/2013 | Togo et al. | 370/228 |
| 2014/0146663 A1 * | 5/2014 | Rao et al. | 370/228 |
| 2014/0355424 A1 * | 12/2014 | Rao et al. | 370/228 |

\* cited by examiner

*Primary Examiner* — Chirag Shah
*Assistant Examiner* — Suk Jin Kang
(74) *Attorney, Agent, or Firm* — Rabin & Berdo, P.C.

(57) ABSTRACT

In a network in which a plurality of protection paths have been formed for one working path between a first node and a second node, each node determines preference levels corresponding to an order to be preferentially used when performing protection switching on the plurality of protection paths. Next, each node exchanges pieces of information about the preference levels determined for the plurality of protection paths.

16 Claims, 8 Drawing Sheets

| 1 | | | | | | | | 2 | | | | | | | | 2 | | | | | | | | 2 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| Request/state | | | | P. Type | | | | Requested Signal | | | | | | | | Bridged Signal | | | | | | | | Preference Level | | | | | | | |
| | | | | A | B | D | R | | | | | | | | | | | | | | | | | | | | | | | | |

FIG. 8

US 9,191,272 B2

PROTECTION SWITCHING METHOD AND APPARATUS

CROSS-REFERENCE TO RELATED APPLICATION

This application claims priority to and the benefit of Korean Patent Application No. 10-2012-0099524 and No. 10-2013-0107097 filed in the Korean Intellectual Property Office on Sep. 7, 2012 and Sep. 6, 2013, the entire contents of which are incorporated herein by reference.

BACKGROUND OF THE INVENTION (a) Field of the Invention

The present invention relates to a protection switching method and apparatus.

(b) Description of the Related Art

Protection switching is a method of restarting traffic to the highest degree when the traffic is stopped due to the generation of a failure in a network. A protection switching method is classified into linear protection switching, ring protection switching, and shared mesh protection switching according to the topology of a network. The linear protection switching includes various protection architectures, such as 1+1, 1:1, 1:N, and M:N.

In protection switching, paths between nodes are basically divided into a working path and a protection path. When there is no failure, traffic is carried along the working path. When a failure occurs in a network or a path is changed by control of an operator, the traffic is carried along the protection path.

Standardization for shared mesh protection switching has recently been under progress. The shared mesh protection switching is a method in which protection paths for protecting a working path between different terminals share limited resources, and is used to improve use efficiency of network resources. In this method, since protection paths allocated for different working paths share limited resources, only a protection path allocated for a working path having high priority can perform switching for traffic using shared resources when a failure is generated in different working paths at the same time. Here, assuming that only one protection path is provided to different working paths, if a working path having high priority uses the protection path due to its failure, the failure of a working path having low priority is not protected.

A working path having low priority can use an m:1 protection architecture so that it can switch traffic to another protection path. That is, protection switching can be performed using an available path, from among m protection paths, by allocating the m protection paths in order to protect one working path.

Meanwhile, in transport networks, such as Ethernet, a Multi-Protocol Label Switching—Transport Profile (MPLS-TP), and an Optical Transport Network (OTN), a 1+1, 1:1, or 1:n protection architecture is used for linear protection switching. The protection architectures have a common point in that they use only one protection path in order to protect one or n working paths.

Accordingly, since only one protection path that can be used when a protection switching situation is generated is present, the allocation of a plurality of protection paths, such as an m:n or m:1 protection architecture, is considered in any Automatic Protection Switching (APS) protocol defined so far.

SUMMARY OF THE INVENTION

The present invention has been made in an effort to provide a method and apparatus in which terminal nodes on both sides switch traffic on a working path to the same path when the traffic needs to be switched in a protection switching structure in which a plurality of protection paths between terminals are allocated in order to protect one working path between terminals.

An exemplary embodiment of the present invention provides a protection switching method of performing protection switching in a network in which a plurality of protection paths are formed for a working path between a first node and a second node, including: determining, by the first node, preference levels for the respective protection paths corresponding to an order to be preferentially used when performing protection switching; and exchanging, by the first node, pieces of information about the preference levels determined for the respective protection paths with the second node so that pieces of information about a preference level for each protection path are identical with each other between the first node and the second node, before performing the protection switching.

Exchanging, by the first node, pieces of information about the preference levels determined for the respective protection paths with the second node so that pieces of information about a preference level for each protection path are identical with each other between the first node and the second node, before performing the protection switching may include sending, by the first node, the pieces of information about the preference levels determined for the plurality of protection paths to the second node, and receiving, by the first node, pieces of information about preference levels for the plurality of protection paths, determined by the second node, from the second node.

Sending, by the first node, the pieces of information about the preference levels determined for the plurality of protection paths to the second node may include sending a message including information about a preference level determined for each protection path to the second node through the protection path.

Receiving, by the first node, pieces of information about preference levels for the plurality of protection paths, determined by the second node, from the second node may include receiving a message including information about a preference level determined for each protection path from the second node through the protection path.

The message may be an Automatic Protection Switching (APS) protocol message. The message may include a field including information about a preference level, and the field may be a reserved region within the APS protocol message or part of the APS protocol message.

The protection switching method may further include identically predetermining preference levels for the plurality of protection paths based on the transmitted preference level information and the received preference level information.

Identically predetermining preference levels for the plurality of protection paths based on the transmitted preference level information and the received preference level information may include: comparing the received preference level information with the transmitted preference level information; generating a report message, including information about a preference level for a protection path whose transmitted preference level information and received preference level information are not identical with each other, if, as a result of the comparison, the received preference level information is not identical with the transmitted preference level information; and determining a preference level for the protection path whose transmitted preference level information and received preference level information are not identical with each other again based on the report message.

The protection switching method may further include performing, by the first node and the second node, the protection switching based on identical preference level information when a protection switching event is generated in a state in which the first node and the second node have identically determined preference levels for the plurality of protection paths.

Another embodiment of the present invention provides a protection switching method of performing protection switching, including: obtaining, by each of two nodes, an identifier allocated to each of a plurality of protection paths in a network in which the plurality of protection paths are formed for one working path between the two nodes; identically determining, by each node, preference levels for each protection path according to a preset preference level determination rule based on an identifier allocated to the protection path before performing the protection switching; and performing, by each node, protection switching according to a preference level determined for each protection path when a protection switching event is generated.

Here, the identifier may be a Maintenance Entity Group (MEG) ID in a packet transport network and may be a Trail Trace Identifier (TTI) in a line transport network.

Yet another embodiment of the present invention provides a protection switching apparatus in which a first node performs protection switching in a network in which a plurality of protection paths are formed between the first node and a second node, including: a preference level determination unit for determining preference levels for the respective protection paths corresponding to an order to be preferentially used when performing protection switching on the protection paths; a priority transmission unit for sending information about the preference levels determined for the plurality of protection paths to the second node; a preference level information reception unit for receiving information about preference levels, determined for the plurality of protection paths by the second node, from the second node; and a preference level resetting unit for determining a preference level determined for a specific protection path again so that information about the preference level is identical with received information about the preference level.

Furthermore, the protection switching apparatus may further include a protection switching execution unit for performing protection switching based on information about preference levels identically determined by the first node and the second node when a protection switching event is generated in a state in which the first node and the second node have identically determined the preference levels for the plurality of protection paths.

Here, the information about the preference levels transmitted or received through the preference level information transmission unit and the preference level information reception unit may be included in the reserved region of an Automatic Protection Switching (APS) protocol message or part of the APS protocol message and transmitted.

The preference level resetting unit may generate a report message, including information about a preference level for a protection path whose transmitted preference level information and received preference level information are not identical with each other based on a result of a comparison between the transmitted preference level information and the received preference level information, and send the report message to the terminal of an operator.

Another embodiment of the present invention provides a protection switching apparatus in which a first node performs protection switching in a network in which a plurality of protection paths are formed for one working path between the first node and a second node, including: a preference level determination unit for obtaining an identifier allocated to each of the protection paths and determining a preference level for each protection path according to a preset preference level determination rule based on the allocated identifier before performing protection switching; and a protection switching execution unit for performing the protection switching based on the preference level determined for each protection path when a protection switching event is generated.

The protection switching execution unit may perform the protection switching based on the preference level determined for each protection path in a state in which the first node and the second node have identically determined the preference levels for the plurality of protection paths according to a preference level determination rule using the identifier.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, in addition, unless explicitly described to the contrary, the word "comprise" and variations such as "comprises" or "comprising" will be understood to imply the inclusion of stated elements but not the exclusion of any other elements.

A protection switching method and apparatus in accordance with exemplary embodiments of the present invention are described below.

Figure 1:
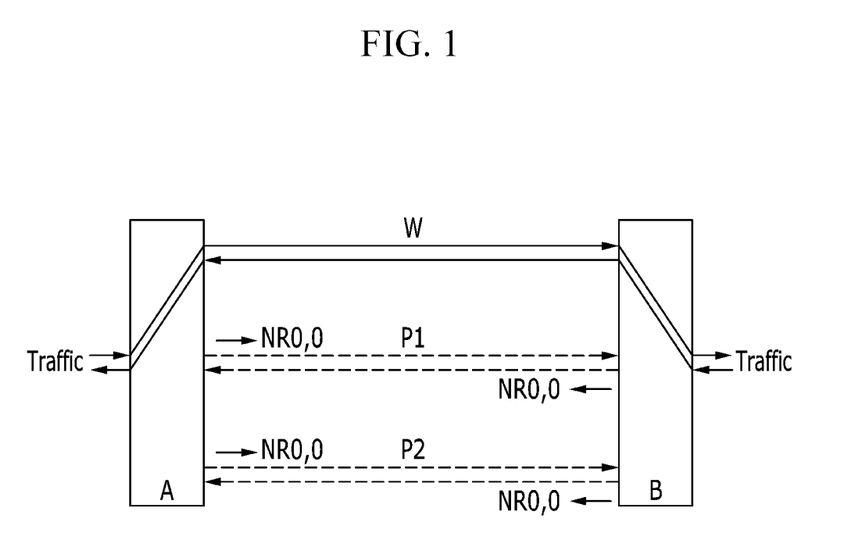
FIG. 1 is a diagram showing an example of an m:1 protection architecture for protection switching.

FIG. 1 is a diagram showing an example of an m:1 protection architecture for protection switching.

FIG. 1 shows an example in which m=2. Terminal nodes A and B on both sides exchange Automatic Protection Switching (APS) messages NR0,0 through respective protection paths P1 and P2. Here, the APS message NR0,0 indicates that there is no request for protection switching (NR: No Request), a corresponding node requests that traffic should not be transmitted through a protection path (first 0), and also the corresponding node does not send traffic through the protection path (second 0). Here, it is assumed that the node A has been configured to preferentially use the protection path P1 and the node B has been configured to preferentially use the protection path P2.

Figure 2:
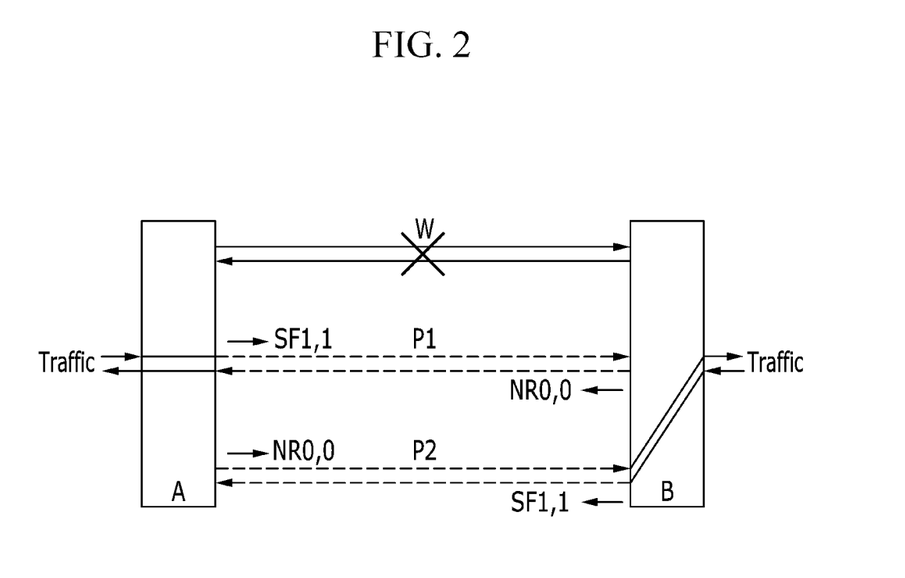
FIG. 2 is a diagram showing the case where a failure has occurred in a protection architecture, such as that of FIG. 1.

FIG. 2 is a diagram showing the case where a failure has occurred in a protection architecture, such as that of FIG. 1.

As shown in FIG. 2, when bi-directional failures are simultaneously generated in a working path W, the node A switches traffic to the protection path P1 and simultaneously sends an APS message SF1,1, and the node B switches traffic to the protection path P2 and simultaneously sends an APS message SF1,1. Here, the APS message SF1,1 indicates that a failure has occurred in a working path (SF: Signal Fail), a corresponding node requests that traffic should be transmitted through a protection path (first 1), and at the same time, the corresponding node sends traffic through the protection path (second 1). Here, the transmitted/received APS message does not include information regarding that traffic on a working path will be transmitted along what protection path because it is assumed to use only one protection path.

Here, if preference levels for a plurality of protection paths predetermined in terminal nodes on both sides are different from each other, there is a problem in that traffic is not normally transferred due to the disconnection of a transport path when a protection switching event is generated.

In an exemplary embodiment of the present invention, in a protection switching structure in which a plurality of protection paths are allocated between terminal nodes, terminal nodes on both sides previously determine what protection path will be preferentially used when using a protection path. Furthermore, terminal nodes on both sides exchange and share pieces of information related to a predetermined preference level for a protection path. Particularly, which one of a plurality of protection paths will be preferentially used is determined in advance or pieces of information related to the protection path used are exchanged between terminal nodes on both sides so that the terminal nodes on both sides can check whether or not predetermined preference levels for the plurality of protection paths are identical with each other in advance. Accordingly, when traffic on a working path needs to be switched, the terminal nodes on both sides can switch the traffic to the same protection path.

Figure 3:
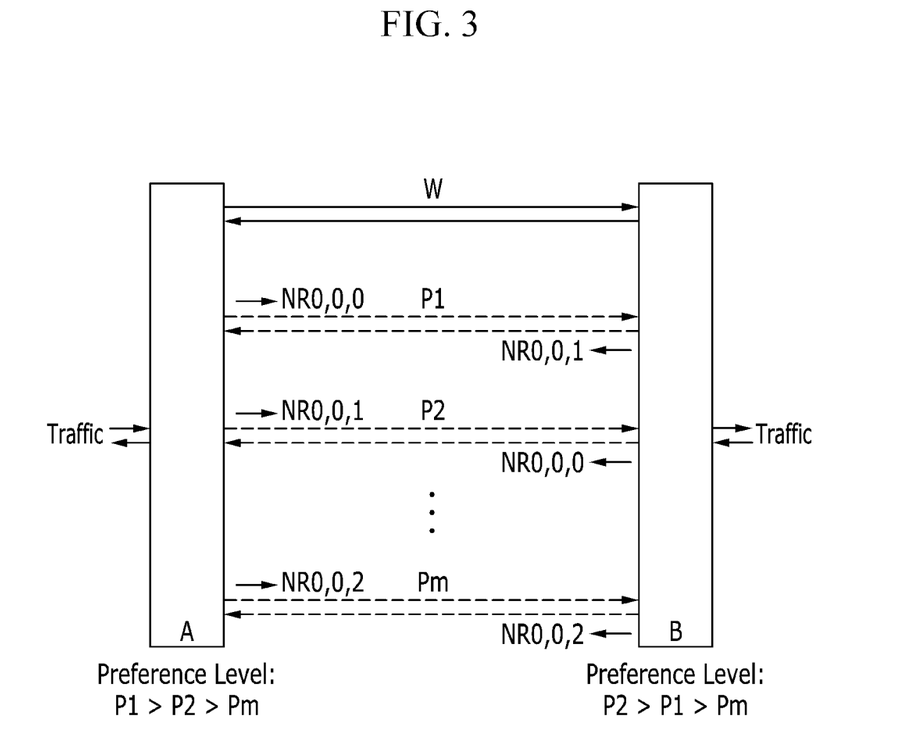
FIG. 3 shows a protection switching structure to which a protection switching method in accordance with an exemplary embodiment of the present invention is applied.

FIG. 3 shows a protection switching structure to which a protection switching method in accordance with an exemplary embodiment of the present invention is applied.

FIG. 3 shows an m:1 protection architecture. First to $m^{th}$ protection paths are formed between a node A and a node B, and each node determines preference levels for the first to $m^{th}$ protection paths. The determination of a preference level can be performed by the selection of an operator or can be performed according to an autonomously predetermined preference level determination method.

Figure 4:
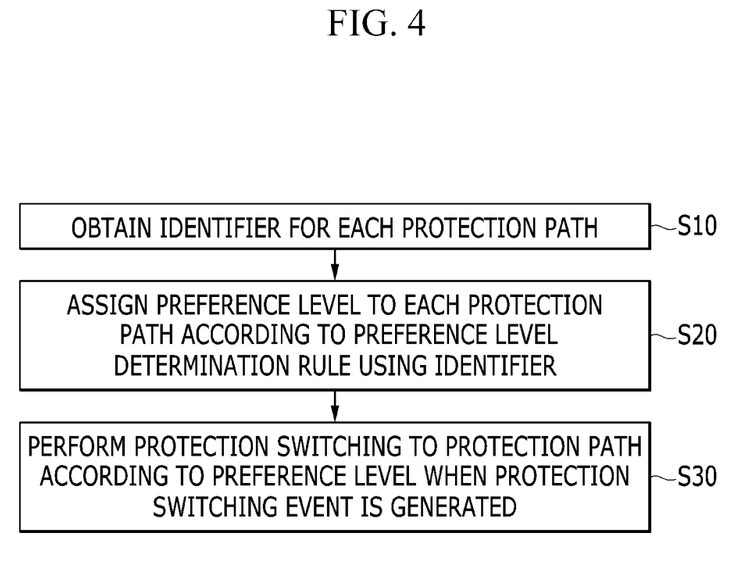
FIG. 4 is a flowchart illustrating a protection switching method in accordance with an exemplary embodiment of the present invention.

FIG. 4 is a flowchart illustrating a protection switching method in accordance with an exemplary embodiment of the present invention.

In an exemplary embodiment of the present invention, terminal nodes on both sides can designate the same protection path to be preferentially used in a protection domain in which a plurality of protection paths are used. The terminal nodes on both sides allocate unique identifiers to the respective protection paths, and previously determine preference levels for first to $m^{th}$ protection paths based on the unique identifiers.

More particularly, as shown in FIG. 4, each node obtains an identifier for each protection path at step S10. Next, each node assigns a preference level to each protection path based on an identifier allocated to the protection path according to a preference level determination rule on which what preference level will be assigned to a protection path having what identifier at step S20. For example, a first node A and a second node B can determine the same preference level in order of the first protection path P1>the $m^{th}$ protection path Pm>the second protection path P2 as shown in FIG. 3 according to a preference level determination rule using identifiers allocated to respective protection paths. For convenience of description, an example in which preference levels for the three protection paths P1, P2, and Pm, from among a plurality of protection paths, are predetermined is described.

Thereafter, when a protection switching event is generated in the state in which the first node A and the second node B have assigned the same preference level to a protection path based on an identifier in advance, the first node A and the second node B simultaneously select one identical protection path from the first to $m^{th}$ protection paths based on information on the preference level, and perform protection switching at step S30.

Any identifier can be used as the identifier in accordance with an exemplary embodiment of the present invention if each protection path can be mapped to a different value in the protection domain. For example, a Maintenance Entity Group (MEG) ID can be used as the identifier in a packet transport network, such as Ethernet or an MPLS-TP. A Trail Trace Identifier (TTI) can be used as the identifier in a transport network, such as an OTN.

In an exemplary embodiment of the present invention, an APS protocol message used in existing linear protection switching can be used without change because protection paths are identified based on unique identifiers within a protection domain, and preference levels for the protection paths are also determined.

Meanwhile, unlike in the method in which terminal nodes on both sides determine the same preference level for each protection path in advance based on an identifier allocated to the protection path as described above, terminal nodes on both sides can exchange pieces of information about preference levels for respective protection paths and make the preference levels for the protection paths identical with each other based on the pieces of information.

To this end, in another exemplary embodiment of the present invention, terminal nodes on both sides exchange pieces of information about preference levels, determined for respective protection paths, using a message.

Figure 5:
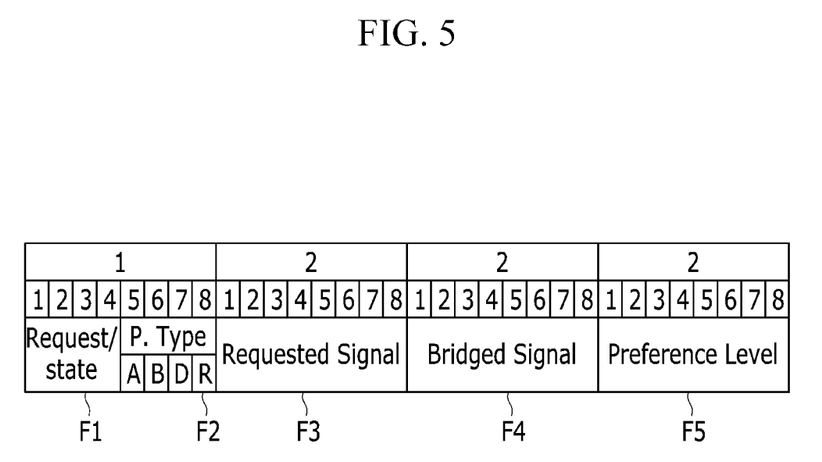
FIG. 5 shows the structure of a message in accordance with another exemplary embodiment of the present invention.

FIG. 5 shows the structure of a message in accordance with another exemplary embodiment of the present invention.

A message transmitted/received between nodes in accordance with an exemplary embodiment of the present invention is an Automatic Protection Switching (APS) protocol message, and is based on structures defined in the Ethernet linear protection switching standard and the Optical Transport Network (OTN) linear protection switching standard. The message has been defined so that it is transported through only a protection path in all standards related to protection switching. However, the present invention is not necessarily limited thereto.

The message transmitted/received between nodes in accordance with an exemplary embodiment of the present invention, that is, the APS message, includes, as shown in FIG. 5, a first field (Request/state) F1, a second field (Protection Type (P. Type)) F2, a third field (Requested Signal) F3, a fourth field (Bridged Signal) F4, and a fifth field (Preference Level) F5.

The first field F1 indicates an operator command or indicates the state of a working path and a protection path. The second field F2 indicates whether or not an APS channel is present, the type of protection switching used, such as a protection architecture, etc.

The third field F3 informs a counterpart terminal node of what traffic needs to be transmitted along a protection path, and includes a transmission request traffic number value. If the transmission request traffic number value is 0, it means that traffic is requested to not be transmitted through a protection path, that is, that traffic is requested to be transmitted through a working path. The fourth field F4 informs a counterpart terminal node of what traffic is transmitted through a protection path, and includes a transmission traffic number value. If the transmission traffic number value is 0, it means that traffic is not transmitted through a protection path, that is, that traffic is transmitted through a working path.

The fifth field F5 includes information about preference levels for a plurality of protection paths. If preference levels for a protection path predetermined in terminal nodes on both sides of a protection domain differ from each other, information about preference levels for a plurality of protection paths predetermined in a corresponding node is included in the fifth field F5 of a transmitted APS message so that pieces of information included in the terminal nodes can be exchanged. Thereafter, a node which has received the APS message can check that the corresponding node has predetermined the preference levels for the plurality of protection paths based on the fifth field F5. A reserved field, that is, a reserved region defined in the standard and not used, can be used as the fifth field F5. As described above, in an exemplary embodiment of the present invention, information about a preference level is included in a reserved region within an APS protocol message or part of the APS protocol message. Accordingly, terminal nodes on both sides can check predetermined preference levels for a plurality of protection paths. Meanwhile, in an m:1 protection architecture, if m is 2, pieces of information about preference levels for two protection paths can be exchanged only using 1 bit in a reserved region within an APS protocol message.

Meanwhile, in a 1+1 or 1:1 protection architecture, values of the third field F3 and the fourth field F4 are 0 or 1. If a failure is not generated in a 1:n protection architecture, values of the third field F3 and the fourth field F4 are 0. If a failure is generated in the 1:n protection architecture, values of the third field F3 and the fourth field F4 become number values of a working path for which a protection path will be used due to the failure.

Figure 6:
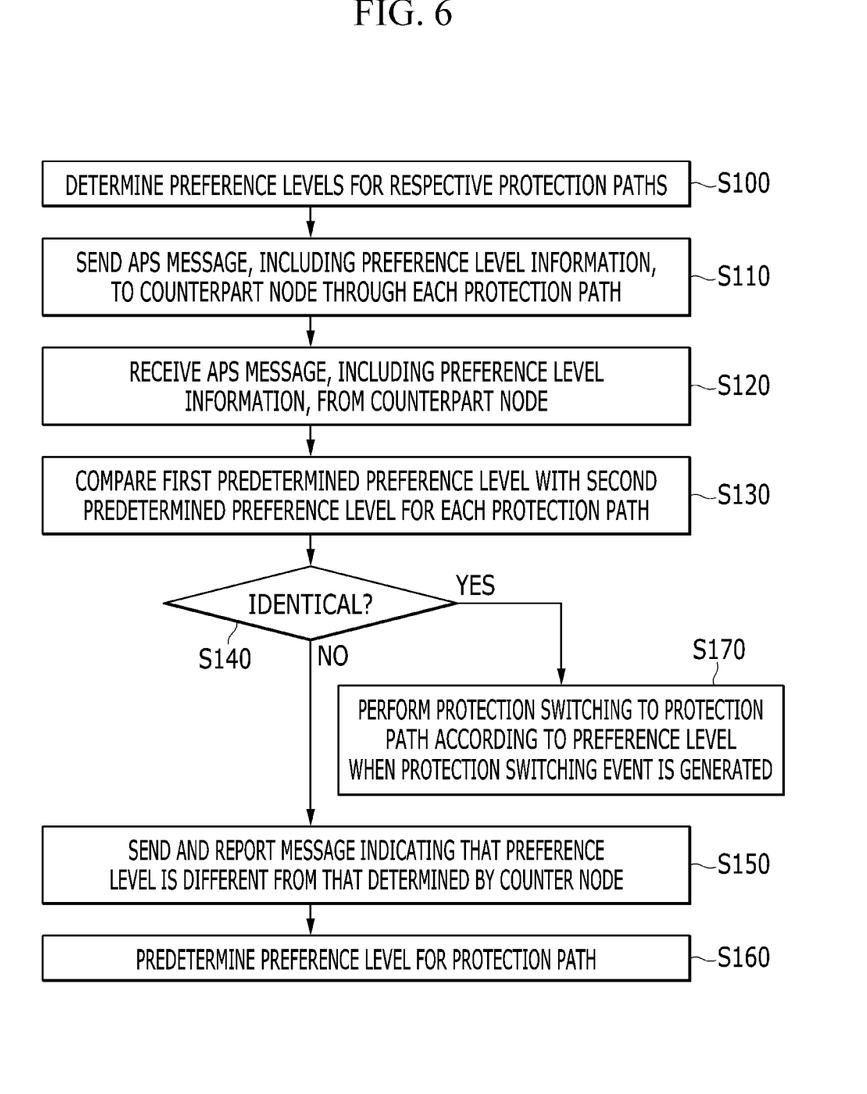
FIG. 6 is a flowchart illustrating a protection switching method in accordance with another exemplary embodiment of the present invention.
Figure 7:
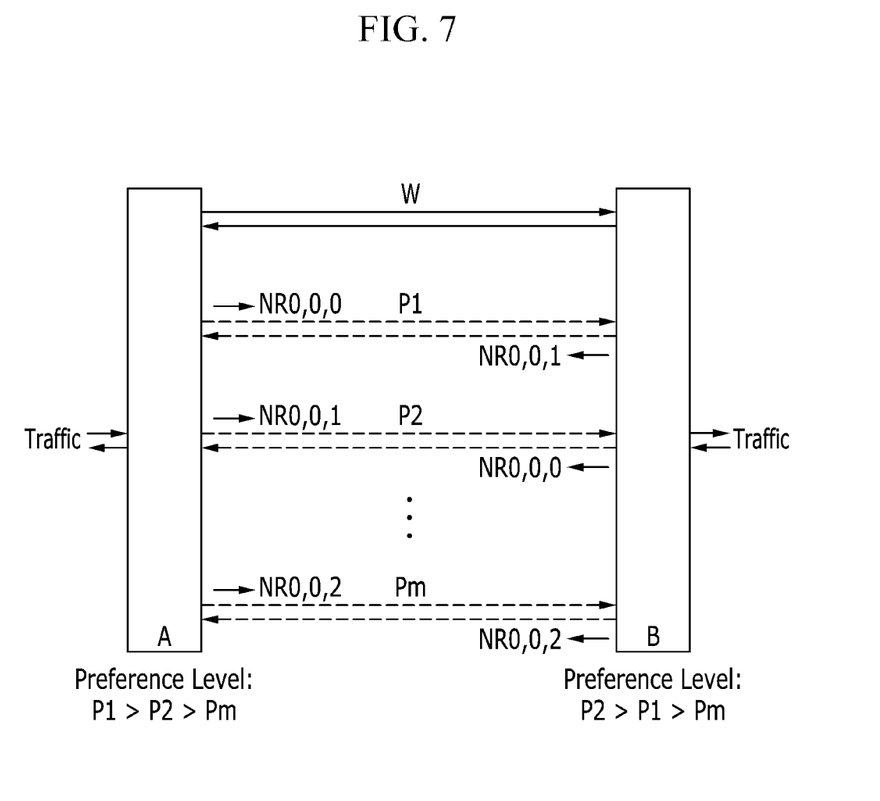
FIG. 7 is a diagram of transmission and reception of signals between nodes in the protection switching method in accordance with another exemplary embodiment of the present invention.

FIG. 6 is a flowchart illustrating a protection switching method in accordance with another exemplary embodiment of the present invention, and FIG. 7 is a diagram the transmission and reception of signals between nodes in the protection switching method in accordance with another exemplary embodiment of the present invention.

As shown in FIG. 6, in a protection architecture (refer to FIG. 7) in which, for example, first to $m^{th}$ protection paths are formed between a first node A and a second node B, each of the first node A and the second node B determines preference levels for the respective first to $m^{th}$ protection paths at step S100. That is, each node determines the preference levels for a plurality of first to $m^{th}$ protection paths. For example, as shown in FIG. 7, the first node A can determine preference levels for the first to $m^{th}$ protection paths in order of the first protection path P1>the second protection path P2>the $m^{th}$ protection path Pm, and the second node B can determine preference levels for the first to mth protection paths in order of the second protection path P2>the first protection path P1>the $m^{th}$ protection path Pm. For convenience of description, an example in which preference levels for only three (P1, P2, and Pm) of the plurality of protection paths are determined is described.

After determining preference levels for the first to $m^{th}$ protection paths, each of the first node A and the second node B sends an APS message, including pieces of information for identifying the preference levels of the protection paths, to a counterpart node, and sends a message, including information about a preference level for each protection path, to the counterpart node at step S110.

Particularly, the first node A sends a message, including information about a preference level predetermined for each protection path, to the second node B through the protection path based on the determination of the preference levels for the first to $m^{th}$ protection paths. Furthermore, the second node B sends a message, including information about a preference level predetermined for each protection path, to the first node A through the protection path based on the determination of the preference levels for the first to $m^{th}$ protection paths.

Here, the message transmitted through the protection path has a form such as an APS message (NR0,0,x). The APS message (NR0,0,x) indicates that there is no request for protection switching (NR: No Request), that traffic is requested to not be transmitted through a protection path (first 0), and also that a corresponding node does not send traffic through the protection path (second 0). Furthermore, the APS message (NR0,0,x) indicates that it includes information "x" about a preference level that is assigned to the protection path. "x" indicates the preference level of a protection path along which the APS protocol message is transmitted.

For example, if the first node A has determined the preference levels for the first to $m^{th}$ protection paths in order of the first protection path P1>the second protection path P2>the $m^{th}$ protection path Pm, the first node A sends an APS message NR0,0,0, including preference level information indicating that the highest preference level has been assigned to the first protection path P1, to the second node B through the first protection path P1, as shown in FIG. 7. Furthermore, the first node A sends an APS message NR0,0,1, including preference level information indicating that a second preference level has been ssigned to the second protection path P2, to the second node B through the second protection path P2. Furthermore, the first node A sends an APS message NR0,0,2, including preference level information indicating that a third preference level has been assigned to the $m^{th}$ protection path Pm, to the second node B through the $m^{th}$ protection path Pm.

Meanwhile, if the second node B has determined the preference levels for the first to $m^{th}$ protection paths in order of the second protection path P2>the first protection path P1>the $m^{th}$ protection path Pm, the second node B sends an APS message NR0,0,0, including preference level information indicating that the highest preference level has been assigned to the second protection path P2, to the first node A through the second protection path P2, as shown in FIG. 7. Furthermore, the second node B sends an APS message NR0,0,1, including preference level information indicating that a second preference level has been assigned to the first protection path P1, to the first node A through the first protection path P1. Furthermore, the second node B sends an APS message NR0, 0,2, including preference level information indicating that a third preference level has been assigned to the $m^{th}$ protection path Pm, to the first node A through the $m^{th}$ protection path Pm.

As described above, each of the first node A and the second node B receives the APS messages from a counterpart node through the protection paths at step S120 and compares a preference level (called a second predetermined preference level for convenience of description) received from a counterpart node with a preference level predetermined itself (called a first predetermined preference level for convenience of description) for a corresponding protection path at step S130.

If, as a result of the comparison, the first predetermined preference level is not identical with the second predetermined preference level, each node reports the report result at steps S140 and S150. Here, each node can report information about a protection path whose first predetermined preference level is not identical with a second predetermined preference level to the terminal of an operator.

In the case of FIG. 7, each of the first node A and the second node B can check whether preference levels (i.e., first predetermined preference levels) predetermined for the first protection path P1 and the second protection path P2 are different from respective preference levels (i.e., second predetermined preference levels) received from a counterpart node. In this case, each of the first node A and the second node B can generate a report message, including information about a protection path whose preference levels are not identical with each other and information about the preference level, differently predetermined by a counterpart node and received from the counterpart node, and send the report message to the terminal of an operator. In this case, the operator of any one of the terminal nodes A and B can modify the preference level based on the report message so that the preference levels of the terminal nodes on both sides are identical with each other. Here, the report message can further include information about a preference level (i.e., first predetermined preference level) predetermined in a corresponding node in relation to a protection path whose preference levels are not identical with each other.

Unlike in the above case, one of the two nodes can send the report message to a counterpart node based on a result of the comparison, and also request the counterpart node to change a preference level for a corresponding protection path into a preference level predetermined by one of the two nodes. Alternatively, one of the two nodes may change a preference level for a protection path whose preference levels are not identical with each other based on a result of the comparison into a preference level received from a counterpart node, and send a message, including information about the changed preference level, to the counterpart node through the protection path.

When reporting a result of the comparison between preference levels as described above, any one of the terminal nodes A and B can modify a corresponding preference level so that preference levels predetermined in the terminal nodes on both sides are identical with each other at step S160.

In accordance with this step, before performing protection switching, terminal nodes on both sides can exchange pieces of information about preference levels predetermined for each protection path in order to make the preference levels for the protection path identical with each other.

After performing the process of making pieces of information about preference levels identical with each other by exchanging the pieces of information about the preference levels or in the state in which preference levels for a protection path are made identical with each other based on a result of the comparison, when a protection switching event is generated, the first node A and the second node B select one identical protection path from the first to mth protection paths at the same time based on preference level information, and perform protection switching using the selected identical protection path at step S170.

The protection switching according to the exemplary embodiments can provide the following advantages.

First, if a plurality of protection paths have been allocated for one working path, a preference level is assigned to a protection path based on a unique identifier within a protection domain. Accordingly, normal protection switching can be performed because terminal nodes on both sides select the same protection path in any conditions.

Second, terminal nodes on both sides include pieces of information about preference levels, predetermined for each protection path, in APS protocol messages, and exchange the APS protocol messages so that the terminal nodes can check whether or not the preference levels in the terminal nodes are identical with each other. Accordingly, normal protection switching can be performed.

Third, terminal nodes on both sides include pieces of information about preference levels, predetermined for each protection path, in APS protocol messages, and exchange the APS protocol messages. Accordingly, an operator can detect a predetermined error even when determining a preference level for each protection path according to a specific rule without depending on a unique identifier within a protection domain.

Figure 8:
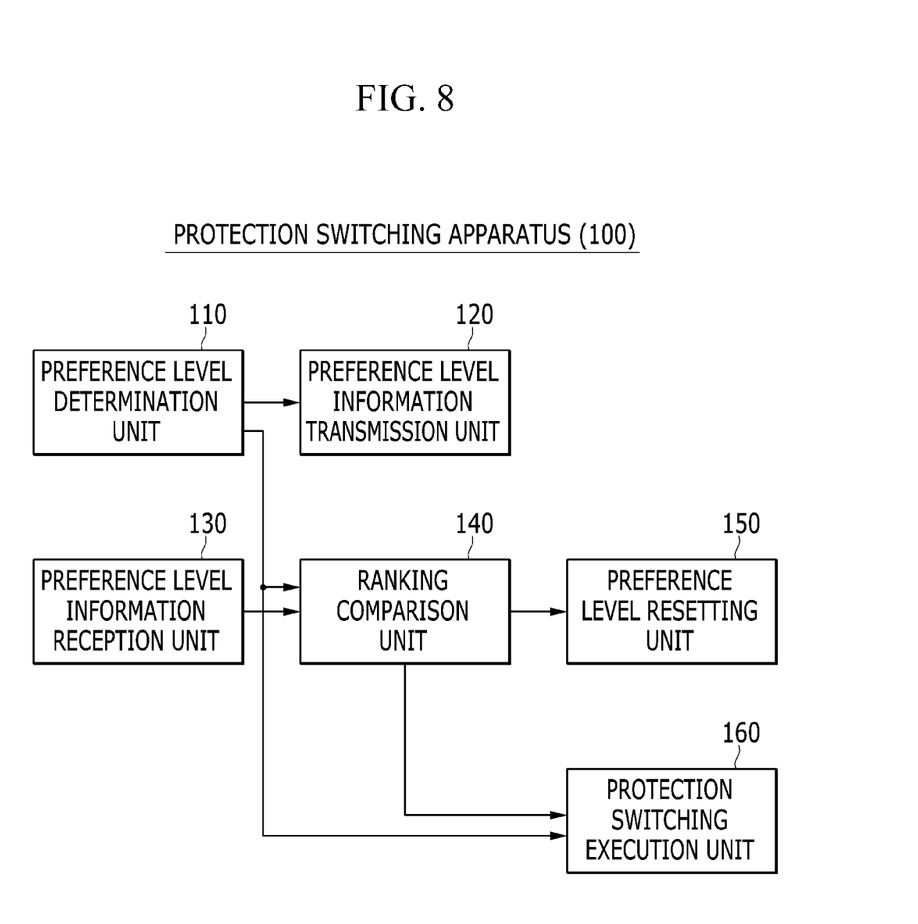
FIG. 8 shows the construction of a protection switching apparatus in accordance with an exemplary embodiment of the present invention.

FIG. 8 shows the construction of a protection switching apparatus in accordance with an exemplary embodiment of the present invention. As shown in FIG. 8, the protection switching apparatus 100 in accordance with an exemplary embodiment of the present invention includes a preference level determination unit 110, a preference level information transmission unit 120, a preference level information reception unit 130, a ranking comparison unit 140, a preference level resetting unit 150, and a protection switching execution unit 160.

The preference level determination unit 110 determines a preference level for each protection path, corresponding to an order that is preferentially used when performing protection switching, in a protection domain including a plurality of protection paths formed between terminal nodes on both sides. The preference level determination unit 110 can determine a preference level for each protection path based on a unique identifier that is allocated to the protection path. Alternatively, the preference level determination unit 110 may determine a preference level for each protection path according to a specific rule set by an operator or a user.

The preference level information transmission unit 120 sends a message, including information about a preference level determined for a protection path, to a counterpart node through the protection path. The message including the information about a preference level can be a message according to an APS protocol, and the message can have a structure such as in FIG. 5.

The preference level information reception unit 130 receives a message, including information about a preference level, from a counterpart node, and also receives a message transmitted through each protection path. The received message can be a message according to an APS protocol, which has a structure such as in FIG. 5.

The ranking comparison unit 140 compares a preference level (i.e., a second predetermined preference level), included in a message received from a counterpart node, with a preference level (i.e., a first predetermined preference level) for each protection path, predetermined by the preference level determination unit 110.

If, as a result of the comparison, the first predetermined preference level is not identical with the second predetermined preference level, the preference level resetting unit 150 resets a preference level for a protection path whose preference levels are not identical with each other. That is, preference levels for a protection path whose preference levels are not identical with each other between nodes can be reset so that they are identical with each other. To this end, the preference level resetting unit 150 can generate a report message including a result of the comparison and send the report message. The report message can include information about a protection path whose first predetermined preference level and second predetermined preference level are not identical with each other. The report message can be reported to the terminal of an operator. Thereafter, a preference level for a protection path whose preference levels are not identical with each other between node terminals on both sides can be reset.

When a protection switching event is generated in the state in which pieces of preference level information about a protection path are identical with each other, the protection switching execution unit 160 selects one identical protection path from a plurality of protection paths based on the preference level information, and performs protection switching using the selected identical protection path.

Meanwhile, if the preference level determination unit 110 determines a preference level for each protection path based on a unique identifier allocated to the protection path, preference level information about the protection path allocated based on the identifier can be immediately provided to the protection switching execution unit 160. In this case, when a protection switching event is generated, the protection switching execution unit 160 can select one identical protection path from a plurality of protection paths based on information about a preference level for each protection path, determined by the preference level determination unit 110, without the processing processes of the preference level information transmission unit 120, the preference level information reception unit 130, the ranking comparison unit 140, and the preference level resetting unit 150, and perform protection switching using the selected identical protection path.

In accordance with an exemplary embodiment of the present invention, when a plurality of protection paths are allocated for one working path, terminal nodes on both sides can select the same protection path based on the same preference level information and perform protection switching. Particularly, normal protection switching can be performed in any conditions because whether or not preference levels predetermined in terminal nodes on both sides are identical with each other can be checked in advance.

The aforementioned exemplary embodiments of the present invention are not implemented only by the method and apparatus, but may be implemented by a program for realizing a function corresponding to the construction according to an exemplary embodiment of the present invention or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A protection switching method of performing protection switching in a network in which a plurality of protection paths are formed for a working path between a first node and a second node, the protection switching method comprising:
   determining, by the first node, first preference levels, each for one of the plurality of protection paths, corresponding to an order in which the first node preferentially selects the protection paths when performing the protection switching; and
   exchanging, by the first node, pieces of information about the first preference levels with the second node so that the first preference levels for each protection path are identical to second preference levels, each determined for one of the plurality of protection paths by the second node, before performing the protection switching, including modifying at least one of the first and second preference levels by
      comparing the first preference levels and the second preference levels,
      generating a report message, comprising information of one of the protection paths of which the first and second preference levels are not identical to each other, based on a result of the comparison, and
      determining a new preference level for the one protection path based on the report message.

2. The protection switching method of claim 1, wherein the exchanging further comprises:
   sending, by the first node, a first message including the first preference levels to the second node; and
   receiving, by the first node, a second message including the second preference levels from the second node.

3. The protection switching method of claim 2, wherein the sending a first message includes sending the first message to the second node through the protection path.

4. The protection switching method of claim 2, wherein the receiving a second message includes receiving the second message from the second node through the protection path.

5. The protection switching method of claim 3, wherein each of the first and second messages is an Automatic Protection Switching (APS) protocol message.

6. The protection switching method of claim 5, wherein the APS protocol message comprises a field including a preference level, and the field is a reserved region within the APS protocol message or part of the APS protocol message.

7. The protection switching method of claim 1, further comprising:
   performing, by the first node and the second node, the protection switching based on the identical first and second preference levels when a protection switching event is generated.

8. A protection switching method of performing protection switching between a first node and a second node that have there between a plurality of protection paths for a working path, comprising:
   obtaining, by each of the first and second nodes, an identifier allocated to each of the plurality of protection paths;
   determining, respectively by the first and second nodes, first and second preference levels, each for one of the protection paths, according to a preset preference level determination rules based on the identifiers allocated to each of the protection paths, and modifying at least one of the first and second preference levels, so that the first and second preference levels for each of the protection paths are identical to each other, before performing the protection switching, the modifying including comparing the first preference levels and the second preference levels, generating a report message, comprising information of one of the protection paths of which the first and second preference levels are not identical to each other, based on a result of the comparison, and determining a new preference level for the one protection path based on the report message; and performing, by the first and second nodes, the protection switching according to the modified first and second preference levels when a protection switching event is generated.

9. The protection switching method of claim 8, wherein the identifier is a Maintenance Entity Group (MEG) ID in a packet transport network and is a Trail Trace Identifier (TTI) in a transport network.

10. A protection switching apparatus in which a first node performs protection switching in a network in which a plurality of protection paths are formed between the first node and a second node, the protection switching apparatus comprising:

a preference level determination unit for determining first preference levels, each for one of the plurality of protection paths, corresponding to an order in which the first node preferentially selects the protection paths when performing the protection switching on the protection paths;

a priority transmission unit for sending a first message including the first preference levels to the second node;

a preference level information reception unit for receiving a second message including second preference levels, each determined for one of the plurality of protection paths by the second node, from the second node; and a preference level resetting unit for modifying at least one of the first and second preference levels, so that the first preference level and the second preference level for each of the plurality of protection paths are identical to each other, by comparing the first preference levels and the second preference levels, generating a report message, comprising information of one of the protection paths of which the first and second preference levels are not identical to each other, based on a result of the comparison, and determining a new preference level for the one protection path based on the report message.

11. The protection switching apparatus of claim 10, further comprising:

a protection switching execution unit for performing the protection switching based on the identical first and second preference levels when a protection switching event is generated.

12. The protection switching apparatus of claim 10, wherein each of the first and second messages is an Automatic Protection Switching (APS) protocol message that includes a reserved region to indicate the first or second determined preference levels.

13. The protection switching apparatus of claim 10, wherein the preference level resetting unit generates a report message that includes information of one of the protection paths of which the first and second preference levels are not identical to each other based on a result of a comparison, and sends the report message to a terminal of an operator.

14. A protection switching apparatus in which a first node performs protection switching in a network in which a plurality of protection paths are formed for one working path between the first node and a second node, the protection switching apparatus comprising:

a preference level determination unit for obtaining an identifier for each of the protection paths and determining a first preference level for each protection path according to a preset preference level determination rule based on the allocated identifier before performing the protection switching;

a preference level information reception unit for receiving a message including second preference levels, each determined for one of the plurality of protection paths by the second node, from the second node;

a preference level resetting unit for modifying at least one of the first and second preference levels, so that the first preference level and the second preference level for each of the plurality of protection paths are identical to each other, by comparing the first preference levels and the second preference levels, generating a report message, comprising information of one of the protection paths of which the first and second preference levels are not identical to each other, based on a result of the comparison, and determining a new preference level for the one protection path based on the report message; and a protection switching execution unit for performing the protection switching to one of the plurality of protection paths based on the first preference levels when a protection switching event is generated.

15. The protection switching apparatus of claim 14, wherein the protection switching execution unit performs the protection switching based on the first preference levels that are identical with the second preference levels.

16. The protection switching apparatus of claim 14, wherein the identifier is a Maintenance Entity Group (MEG) ID when the network is a packet transport network and is a Trail Trace Identifier (TTI) when the network is a line transport network.

* * * * *